Aug. 26, 1941. N. STRACHOVSKY 2,253,991
FROCESS FOR THE REGENERATION OF WASTE OF ARTIFICIAL AND SYNTHETIC LEATHERS
Filed April 17, 1937
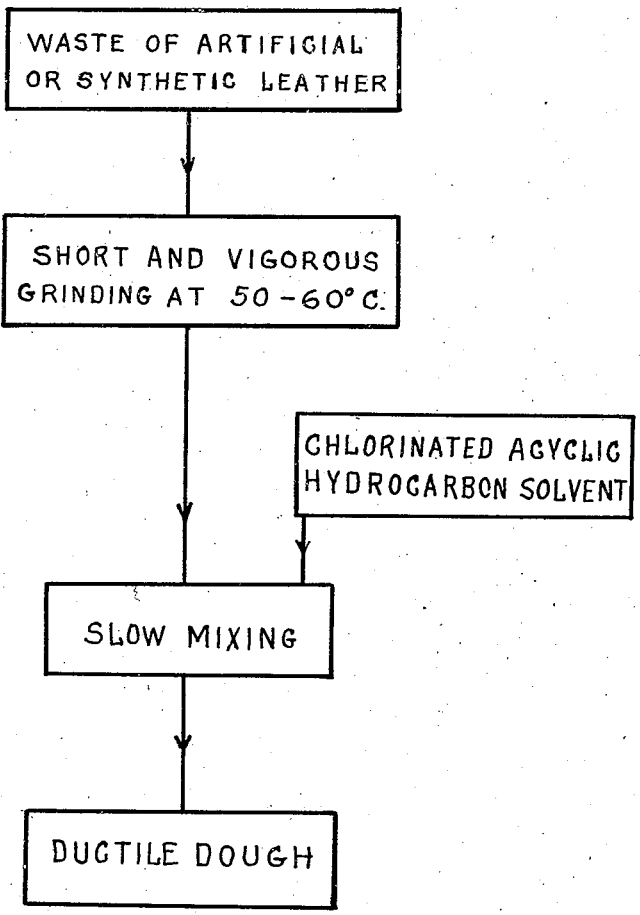
Inventor
NIKITA STRACHOVSKY
By Young, Emery & Thompson
Attorneys Patented Aug. 26, 1941

2,253,991

UNITED STATES PATENT OFFICE 2,253,991

PROCESS FOR THE REGENERATION OF WASTE OF ARTIFICIAL AND SYNTHETIC LEATHERS

Nikita Strachovsky, Paris, France, assignor to Société Salpa Française, Paris, France, a corporation Application April 17, 1937, Serial No. 137,595
In France April 30, 1936

2 Claims. (Cl. 18—48)

The present invention has for its object to reclaim the waste of artificial or synthetic leather, and to transform it into materials adapted to serve as substitutes for natural, artificial or synthetic leather.

The sheets, rolls, or other pieces of artificial and synthetic leather, the source of the waste which is to be treated in conformity with the invention, usually consists of animal, vegetable or mineral fibres which are agglomerated by means of plastic substances. Such plastic substances are usually selected among the agglutinants which may be polymerized, such as rubber, the synthetic resins, or the natural siccative oils and resins.

In the manufacture of artificial and synthetic leather, the polymerization of the agglutinants is indispensable in order that the final product shall have a good resistance to oxidation and wear.

This polymerisation has also the effect of considerably increasing the resistance of such artificial and synthetic leathers to the dissolving action of the ordinary solvents.

In order to be able to treat the waste with a suitable solvent in such way as to obtain a paste may be given any desired form, the agglutinants contained in the waste are depolymerized.

For the depolymerisation of the plastic substances which have been subjected to a forced polymerisation, it is a matter of known practice to subject such substances to a prolonged grinding or to a considerable heating. But such methods would not be suitable for the depolymerization of waste of artificial and synthetic leather, as the animal or vegetable fibres forming the major part of such waste would be entirely destroyed by the action of the heat.

In the drawing, the flow sheet represents the steps followed in carrying out the present invention.

In accordance with the invention, for the polymerization of the agglutinating substances contained in the waste of artificial or synthetic leather, the waste is first subjected to a short and energic grinding at a moderate temperature, and immediately after the grinding the mass is mixed up slowly in the presence of a suitable solvent, in order to obtain a dough which is ductile and malleable, and is adapted to receive any desired form.

In carrying out the invention, use is made of a grinding machine, such as a grinder for rubber powder, comprising two hollow cylinders juxtaposed, whose speed ratio is between ½ and ⅕, in order to produce an energetic friction. The periphery speed of the slower cylinder should be at least 30 metres per minute.

The hollow cylinders of the grinding machine are adapted for the circulation of a heating or a cooling fluid, in order to maintain the temperature of the mass between 50° and 60° C.

The waste undergoes but a single treatment in the grinder, and by this operation, the small parts containing several agglomerated fibres are suddenly detached and thrown out. Owing to the moderate temperature, such fibres are not subjected to any harmful alteration.

On the other hand, by reason of the violent nature of the operation and the heating of the material, there is produced an instability of the polymerized state and consequently it is affected, for several hours, by the action of solvents.

Immediately after the above-mentioned grinding, the mass is subjected to a slight mechanical operation, such as a slow mixing in the presence of a solvent which has a great penetration and whose boiling point is below 85° C. This mixing may take place in a mixing machine provided with paddles, as used for pastes, and it should be continued for at least three hours.

The solvent consists of a chlorinated hydrocarbon such as dichlorethylene, trichlorethylene or tetrachloride of carbon, and to each of these bodies may be added 5% of tetrachlorethane or trichloromethane.

After the mixing, the product has the appearance of a ductile dough which may be given any desired form, such as sheets, cylindrical pieces, or the like.

In order to obtain sheets of suitable thickness, use may be chiefly made of a wind-up calender comprising a pressing cylinder under hydraulic control or provided with a counterweight, in order to ensure a constant pressure irrespectively of the thickness of the sheet which regularly increases during the calendering process.

Use can also be made of an extruding machine in order to obtain the leather in the form of a solid or a hollow roll, or a direct moulding can also be employed.

If it is desired that the final product shall offer a greater resistance to oxidation and to wear, it is preferable to resort to a re-polymerization. For this purpose, there are added to the dough, before it leaves the mixing machine and after at least two hours of mechanical treatment, agents which are adapted to effect a second polymerization of the plastic binding material after it has been freed from its solvent.

For the agent of re-polymerization employed with the waste matter in which the agglomeration has been effected by rubber, use can be made of very rapid accelerating substances which are active in an acid medium (such as the mercaptans and their oxidation products, with the addition of guadinines) together with colloidal sulphur and activating substances largely containing fatty acids such as stearic acid and oleic acid.

In the case of the re-polymerization of waste matter from artificial or synthetic leather which are agglomerated by the synthetic resins, it will be necessary to add to the dough an organic acid or a diluted base.

For instance if the binding material consists of glycero-phthalic resins, sulphonic acid at 2% can be employed. In the case of resin which is formed by the condensation of urea and formaldehyde, a 10% solution of caustic soda or potash will be suitable. If the waste matter has been agglomerated by natural siccative oils or resins, use will be made of a siccative containing a metallic acid, such as a linolate or a naphthenate of cobalt, lead or manganese.

Should it be desired to modify the consistency of the dough of the reclaimed waste matter, it is feasible to incorporate during the work of the mixing machine and before adding the agents of re-polymerization, charges of inert and insoluble substances, or plasticizing agents.

For instance, if it is desired to obtain a harder final product, kaolin, calcium carbonate, or barium sulphate can be added.

If it is desired to make the product softer, it is possible to add a plasticizing substance, such as a mineral oil or a vegetable oil, vulcanized or not.

If it is necessary to increase the resistance to wear or to oxidation, animal, vegetable or mineral fibres may be added.

If it is desired to render the product more elastic, it is possible to add agglutinating plastic substances such as rubber.

The products obtained in conformity with the invention, from a dough consisting of reclaimed waste of artificial and synthetic leather, may be utilized in the same manner as the natural or the artificial leathers and can be substituted for these latter in the greater part of their applications.

I claim:

1. A process for manufacturing artificial leather composed of fibrous material and a polymerized agglomerant selected from the group consisting of rubber and synthetic resins, consisting of subjecting wastes of artificial leather to a short and vigorous disintegration by grinding at a temperature of about 50–60° C., and then subjecting the disintegrated material to a mechanical working in the presence of a solvent selected from the group of chlorinated acyclic hydrocarbons.

2. A process of manufacturing artificial leather, comprising subjecting waste of artificial leather containing about 70% fibers of leather and an agglomerant formed of rubber to a short and vigorous disintegration by grinding at a temperature of about 50–60° C. and then subjecting the disintegrated material to a mechanical working in the presence of trichlorethylene.

NIKITA STRACHOVSKY.